(12) United States Patent
Han et al.

(10) Patent No.: US 8,754,965 B2
(45) Date of Patent: Jun. 17, 2014

(54) IMAGE PROCESSING APPARATUS AND METHOD FOR REMOVING LENS DISTORTION AND CHROMATIC ABERRATION, AND COMPUTER READABLE MEDIUM STORING COMPUTER PROGRAM TO EXECUTE THE IMAGE PROCESSING METHOD

(75) Inventors: Ho-suk Han, Osan-si (KR); Kyu-yul Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 12/978,816

(22) Filed: Dec. 27, 2010

(65) Prior Publication Data
US 2011/0157432 A1   Jun. 30, 2011

(30) Foreign Application Priority Data
Dec. 29, 2009  (KR) .................. 10-2009-0132823

(51) Int. Cl.
*H04N 5/217*  (2011.01)
*H04N 5/228*  (2006.01)

(52) U.S. Cl.
USPC ...................................... 348/241; 348/222.1

(58) Field of Classification Search
USPC ...................................................... 348/241
See application file for complete search history.

(56) References Cited

U.S. PATENT DOCUMENTS

| 6,600,548 | B2 * | 7/2003 | Enomoto | 355/40 |
| 6,747,757 | B1 * | 6/2004 | Enomoto | 358/1.9 |
| 6,853,400 | B1 * | 2/2005 | Matama | 348/96 |
| 7,227,574 | B2 * | 6/2007 | Yamanaka | 348/242 |
| 7,321,685 | B2 * | 1/2008 | Okada et al. | 382/167 |
| 7,433,089 | B2 * | 10/2008 | Enomoto | 358/474 |
| 8,035,068 | B2 * | 10/2011 | Ishigaki et al. | 250/208.1 |

* cited by examiner

*Primary Examiner* — Ngoc-Yen Vu
(74) *Attorney, Agent, or Firm* — Drinker Biddle & Reath LLP

(57) ABSTRACT

An image processing apparatus for processing an input image generated by an image pick-up device from an optical signal passing through a lens includes a first module comprising a plurality of chromatic aberration correction units that correct chromatic aberration in the input image; a second module, configured independently of the first module in terms of hardware, comprising a lens distortion correction unit that corrects lens distortion in the input image; a memory that stores data; and a bus connected to the first module, the second module, and the memory, and that transfers data between the first module, the second module, and the memory. The data is transferred in an on-the-fly method between the plurality of chromatic aberration correction units of the first module. The first module outputs data processed in units of blocks that are units for processing the data of the input image in the first module. The second module performs lens distortion correction when the data of the input image of a block is output from the first module.

22 Claims, 16 Drawing Sheets

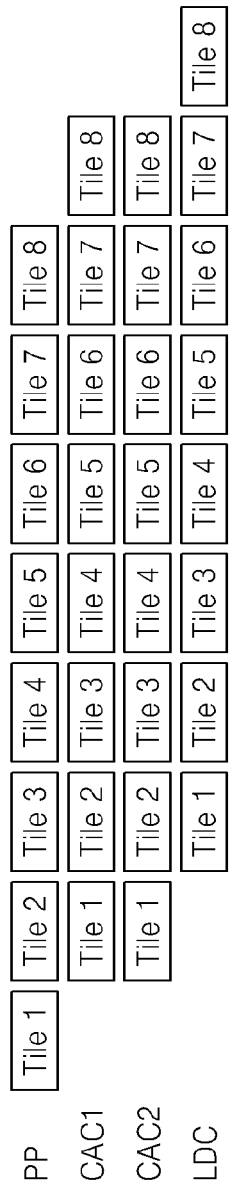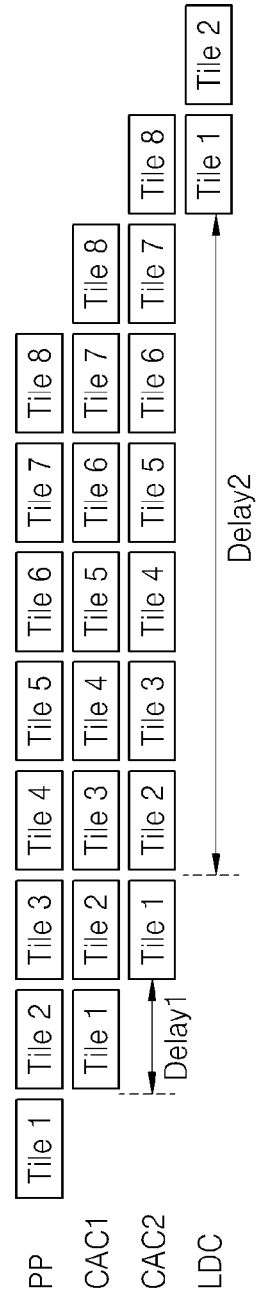

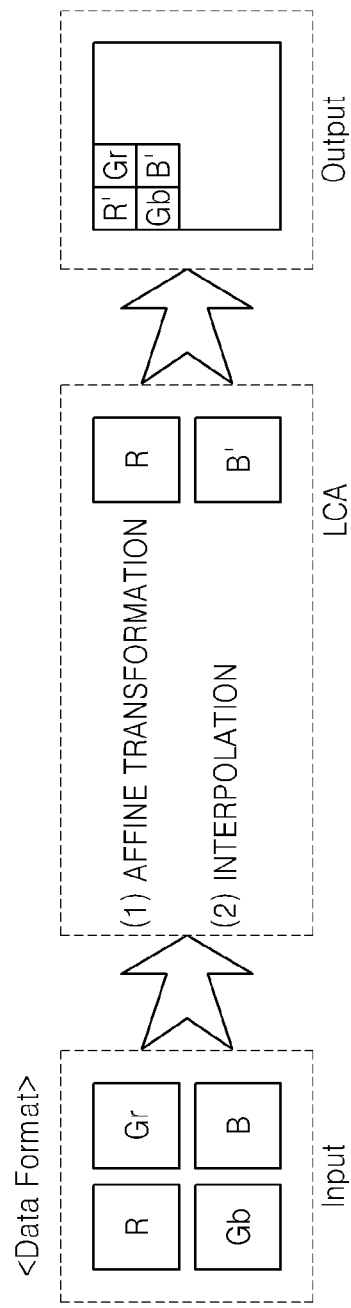

FIG. 7C

| TYPE OF LENS | ZOOMING STEP | R | G | B |
|---|---|---|---|---|
| LENS A | ZOOM 1 | $N_1$ | . | $N_2$ |
| | ZOOM 2 | $N_3$ | . | $N_4$ |
| | ⋮ | ⋮ | ⋮ | ⋮ |
| LENS B | ZOOM 1 | | | |
| | ZOOM 2 | | | |
| | ⋮ | ⋮ | ⋮ | ⋮ |

IMAGE PROCESSING APPARATUS AND METHOD FOR REMOVING LENS DISTORTION AND CHROMATIC ABERRATION, AND COMPUTER READABLE MEDIUM STORING COMPUTER PROGRAM TO EXECUTE THE IMAGE PROCESSING METHOD

CROSS-REFERENCE TO RELATED PATENT APPLICATIONS

This application claims the priority benefit of Korean Patent Application No. 10-2009-0132823, filed on Dec. 29, 2009, in the Korean Intellectual Property Office, the disclosure of which is incorporated herein in its entirety by reference.

BACKGROUND

1. Field of the Invention

Embodiments relate to an image processing apparatus and method for removing lens distortion and chromatic aberration from an input image, and a computer readable medium storing a computer program to execute the image processing method.

2. Description of the Related Art

Images are photographed by using a photographing apparatus and light input through a lens is converted to an electrical signal by an image pick-up device. The position of the lens is adjusted to focus the incident light at the image pick-up device. When the focusing fails, a subject to be photographed is defocused and photographed to be blurred.

As the light passing through the lens is refracted, the path of light is changed so that the surface where the focus is formed may appear to be curved, not flat. Thus, distortion by the lens may occur at a light receiving surface of the image pick-up device that is flat or almost flat, which is referred to as lens distortion.

Also, incident light includes light rays of all wavelengths. The refractive index of the light at a lens varies according to the wavelength of the light. That is, as the wavelength increases, the refractive index decreases. As the wavelength decreases, the refractive index increases. Accordingly, as the light rays of different wavelengths pass through the lens, the path of each light ray varies according to the wavelength thereof and the position for focusing varies according to the wavelength thereof. As a result, a phenomenon in which a photographed image is defocused or color is blurred may occur, which is referred to as chromatic aberration.

SUMMARY

To solve the above and/or other problems, the below-described embodiments reduce hardware conflict due to conflict between resources by reconfiguring hardware modules, and reduce image processing time by reducing memory access operations, in performing a plurality of chromatic aberration corrections and lens distortion corrections.

According to an embodiment, an image processing apparatus for processing an input image generated by an image pick-up device from an optical signal passing through a lens includes a first module comprising a plurality of chromatic aberration correction units that correct chromatic aberration in the input image; a second module, configured independently of the first module in terms of hardware, including a lens distortion correction unit that corrects lens distortion in the input image; a memory that stores data; and a bus connected to the first module, the second module, and the memory, and that transfers data between the first module, the second module, and the memory. The data is transferred in an on-the-fly method between the plurality of chromatic aberration correction units of the first module. The first module outputs data processed in units of blocks that are units for processing the data of the input image in the first module. The second module performs lens distortion correction when the data of the input image of a block is output from the first module.

The plurality of chromatic aberration correction units may include a first chromatic aberration correction unit that corrects chromatic aberration in the input image by using a chromatic aberration correction parameter that is determined according to at least one of a type and position of a lens, and a second chromatic aberration correction unit that corrects chromatic aberration on the data of the input image that is processed by the first chromatic aberration correction unit, based on contrast of the data of the input image that is processed by the first chromatic aberration correction unit. The lens distortion correction unit corrects lens distortion in the input image that is processed by the first module.

The first chromatic aberration correction unit may include an affine transformation unit that performs affine transformation to correct chromatic aberration in the input image by using the chromatic aberration correction parameter, and an interpolation unit that performs an interpolation process on the data of the input image that is affine transformed.

The input image may be an N-dimensional image, where N is a natural number, and the affine transformation unit may perform affine transformation on N-independent coordinates, independently of each other, with respect to the N-dimension.

The first chromatic aberration correction unit may use two line memories. The line memory may denote a storage space that stores a pixel corresponding to a row or column of the input image. The processed data of the input image may be output in an on-the-fly method in units of a line memory.

The input image input to the first chromatic aberration correction unit may have an RGB data format, and the first chromatic aberration correction unit may perform chromatic aberration correction on each of the R and B data independently of each other and bypass G data without performing the chromatic aberration correction.

The first module may further include an intermediate processing unit that performs at least one of a white balance process and a noise reduction process on the data of the input image that is processed by the first chromatic aberration correction unit, and the second chromatic aberration correction unit may perform chromatic aberration correction on the data of the input image that is processed by the intermediate processing unit.

The second chromatic aberration correction unit may include a data conversion unit that converts the data of the input image to a YCbCr data format; a chromatic aberration measurement unit that measures a degree of generation of chromatic aberration, from the data of the input image, based on contrast information of the input image; a chromatic aberration removal unit that corrects chromatic aberration from the data of the input image according to the degree of generation of chromatic aberration; and an image synthesis unit that linearly synthesizes an image corrected by the chromatic aberration removal unit and an original image of the input image.

The data transferred between the first and second modules may be transferred via the bus and the memory.

According to another embodiment, an image processing method for processing an input image generated by an image pick-up device from an optical signal passing through a lens includes performing a plurality of chromatic aberration correction processes on the input image, by transferring data in an on-the-fly method; storing the data processed by the plurality of chromatic aberration correction processes in a memory in units of blocks that are units for processing data of the input image in performing of the plurality of chromatic aberration correction processes; and correcting lens distortion in the input image stored in the memory. The performing of the plurality of chromatic aberration correction processes and the correction of lens distortion are performed by using resources configured independently in terms of hardware. When the chromatic aberration correction of the data of the input image of a block in the performing of the plurality of chromatic aberration correction processes is completed, in the correction of lens distortion, lens distortion correction is performed on the data of the input image of a block where the chromatic aberration is corrected.

The performing of the plurality of chromatic aberration correction processes may include a first chromatic aberration correction operation that corrects chromatic aberration in the input image by using a chromatic aberration correction parameter that is determined according to at least one of a type and position of a lens; and a second chromatic aberration correction operation that corrects chromatic aberration on the data of the input image that is processed in the first chromatic aberration correction operation, based on contrast of the data of the input image that is processed in the first chromatic aberration correction operation.

The first chromatic aberration correction operation may include an affine transformation operation that performs affine transformation to correct chromatic aberration in the input image by using the chromatic aberration correction parameter; and an interpolation operation that performs an interpolation process on the data of the input image that is affine transformed.

The input image may be an N-dimensional image, where N is a natural number. In the affine transformation operation, affine transformation is performed on N-independent coordinates, independently of each other, with respect to the N-dimension.

In the first chromatic aberration correction operation, two line memories may be used. The line memory may denote a storage space for storing a pixel corresponding to a row or column of the input image, and the processed data of the input image may be output in an on-the-fly method in units of a line memory.

The input image processed in the first chromatic aberration correction operation may have an RGB data format, and in the first chromatic aberration correction operation, chromatic aberration correction may be performed on each of the R and B data independently of each other and G data may be bypassed without application of the chromatic aberration correction.

The image processing method may further include an intermediate processing operation, after the first chromatic aberration correction operation, in which at least one of a white balance process and a noise reduction process is performed on the data of the input image that is processed in the first chromatic aberration correction operation, wherein in the second chromatic aberration correction operation, chromatic aberration correction is performed on the data of the input image that is processed in the intermediate processing operation.

The second chromatic aberration correction operation may include a data conversion operation that converts the data of the input image to a YCbCr data format; a chromatic aberration measurement operation that measures a degree of generation of chromatic aberration, from the data of the input image, based on contrast information of the input image; a chromatic aberration removal operation that corrects chromatic aberration from the data of the input image according to the degree of generation of chromatic aberration; and an image synthesis operation that linearly synthesizes an image corrected in the chromatic aberration removal operation and an original image of the input image.

According to another embodiment, a non-transitory computer readable storage medium has stored thereon a computer program executable by a processor for performing the image processing method of processing an input image generated by an image pick-up device from an optical signal passing through a lens.

BRIEF DESCRIPTION OF THE DRAWINGS

The above and other features and advantages will become more apparent by describing in detail exemplary embodiments with reference to the attached drawings in which:

FIG. 6A illustrates the structure of a pipeline of an image processing apparatus, according to an embodiment;

FIG. 6B illustrates the structure of a pipeline of an image processing apparatus, according to a comparative example to the embodiment;

FIG. 7A is a conceptual diagram illustrating the operation of the first chromatic aberration correction unit, according to an embodiment;

FIG. 7C illustrates examples of chromatic aberration correction parameters, according to an embodiment;

DETAILED DESCRIPTION

Figure 1:
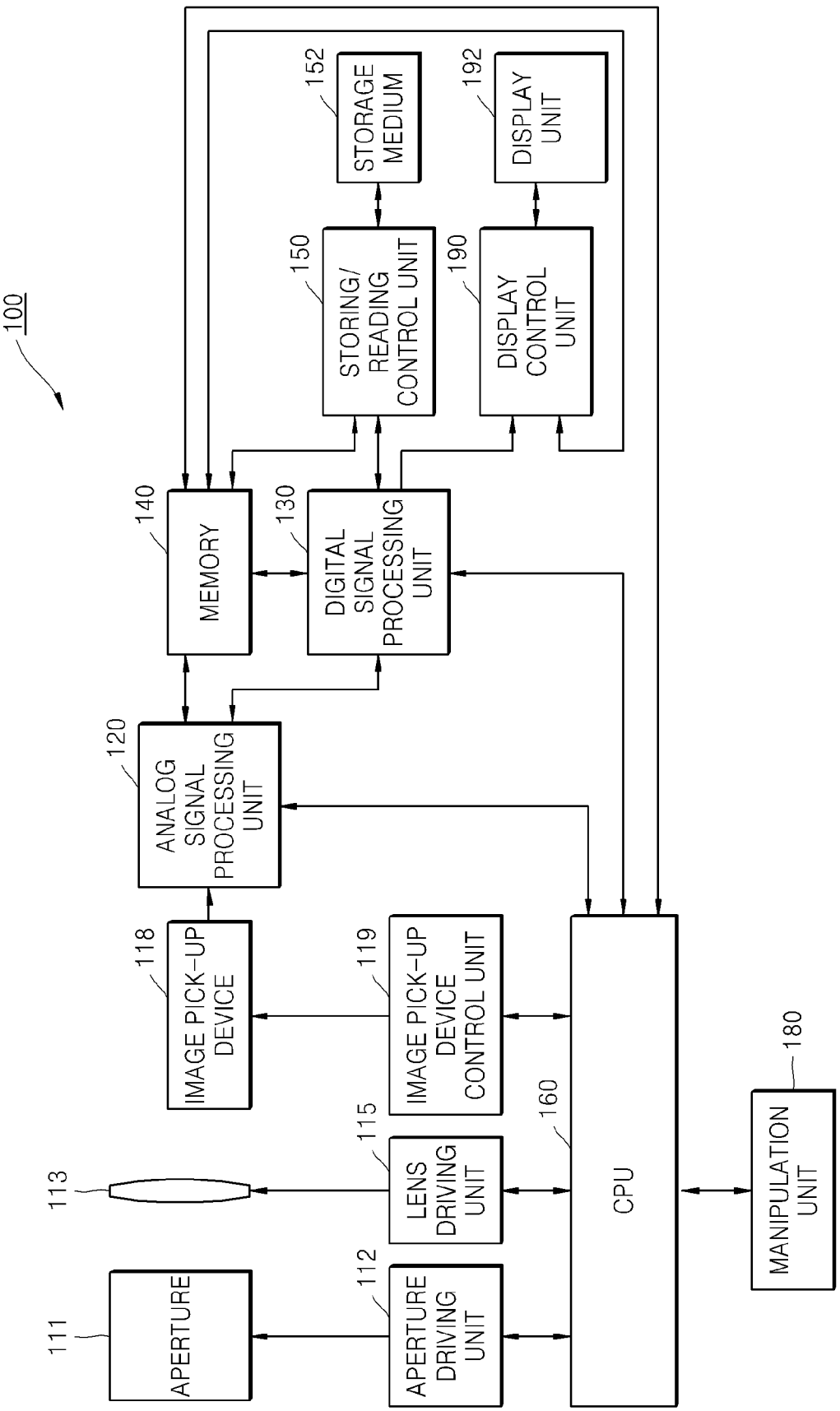
FIG. 1 is a block diagram of an image processing apparatus, according to an embodiment.

The attached drawings for illustrating exemplary embodiments are referred to in order to gain a sufficient understanding of the embodiments, the merits thereof, and the objectives accomplished by the implementation of the embodiments.

Hereinafter, the exemplary embodiments will be described in detail with reference to the attached drawings. Like reference numerals in the drawings denote like elements.

FIG. 1 is a block diagram of an image processing apparatus 100, according to an embodiment. Referring to FIG. 1, the image processing apparatus 100 according to the present embodiment may be implemented by a digital photographing apparatus having a photographing function. Also, an image input to the image processing apparatus 100 may be an image photographed by the digital photographing apparatus. When the image processing apparatus 100 is implemented by a digital photographing apparatus in FIG. 1, the structure of the image processing apparatus 100 according to the present embodiment will be schematically described below.

The image processing apparatus 100 may include an aperture 111, an aperture driving unit 112, a lens 113, a lens driving unit 115, an image pick-up device 118, an image pick-up device control unit 119, an analog signal processing unit 120, a digital signal processing unit 130, a memory 140, a storing/reading control unit 150, a storage medium 152, a CPU 160, a manipulation unit 180, a display control unit 190, and a display unit 192.

The overall operation of the image processing apparatus 100 is controlled by the CPU 100. The CPU 100 provides the aperture driving unit 112, the lens driving unit 115, and the image pick-up device control unit 119 with control signals for the operation of each of the constituent elements.

A degree of opening/closing of the aperture 111 is adjusted by the aperture driving unit 112. The aperture 111 adjusts the amount of light input to the image pick-up device 118.

The lens 113 may include a plurality of lenses such as a zoom lens or a focus lens. The lens driving unit 115 adjusts the position of the lens 113 according to the control signal provided by the CPU 160.

An optical signal passing through the aperture 111 and the lens 113 arrives at a light receiving surface of the image pick-up device 118 to form an image of a subject (not shown). The image pick-up device 118 may be a charge coupled device (CCD) or a complementary metal oxide semiconductor image sensor (CIS) that converts an optical signal to an electric signal. The image pick-up device control unit 119 may adjust sensitivity of the image pick-up device 118. The image pick-up device control unit 119 may control the image pick-up device 118 according to a control signal automatically generated by an image signal that is real time input, or a control signal manually input by the operation of a user.

The exposure time of the image pick-up device 118 is adjusted by a shutter (not shown). The shutter may include a mechanical shutter for adjusting the input of light by moving blades, or an electronic shutter for exposure by providing an electric signal to the image pick-up device 118.

The signal processed by the analog signal processing unit 120 may be input to the digital signal processing unit 130 with or without passing through the memory 140, or to the CPU 160. The memory 140 may include a ROM or RAM. The digital signal processing unit 130 may perform digital signal processing such as gamma correction or white balance adjustment.

The image data output from the digital signal processing unit 130 is transferred to the display control unit 190 directly or via the memory 140. The display control unit 190 controls the display unit 192 to display an image on the display unit 192.

Also, the image data output from the digital signal processing unit 130 is input to the storing/reading control unit 150 directly or via the memory 140. The storing/reading control unit 150 stores the image data in the storage medium 152 automatically or according to a signal input by a user. The storing/reading control unit 150 reads data about an image from an image file stored in the storage medium 152 and inputs the image data to the display control unit 190 via the memory 140 or other path, to display the image on the display unit 192. The storage medium 152 may be detachable or permanently installed on the image processing apparatus 100.

The manipulation unit 180 is used by a user to input a control signal. The manipulation unit may include a shutter-release button to input a shutter-release signal to photograph a picture by exposing the image pick-up device 118 to light for a predetermined time, a power button to input a control signal for controlling power on/off, a wide-zoom button and a tele-zoom button to increase or decrease a viewing angle according to an input, and a variety of function buttons to select a white balance setting function, an exposure setting function, or a mode such as a text input mode, a photographing mode, or a play mode. The manipulation unit 180 may be implemented in any form, for example, a button, a keyboard, a touch pad, a touch screen, or a remote controller as long as a user can input a control signal.

FIG. 1 illustrates an exemplary structure of the image processing apparatus 100, according to an embodiment. The detailed structure of the image processing apparatus 100 may vary according to various embodiments. Thus, the embodiments of the structure of the image processing apparatus 100 of FIG. 1 should not be construed as limiting.

Figure 2A:
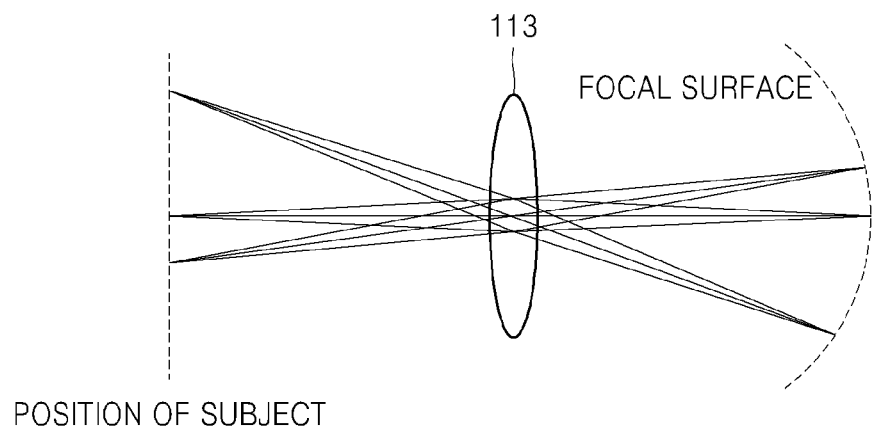
FIGS. 2A and 2B illustrate the principle of generation of the lens distortion.
Figure 2B:
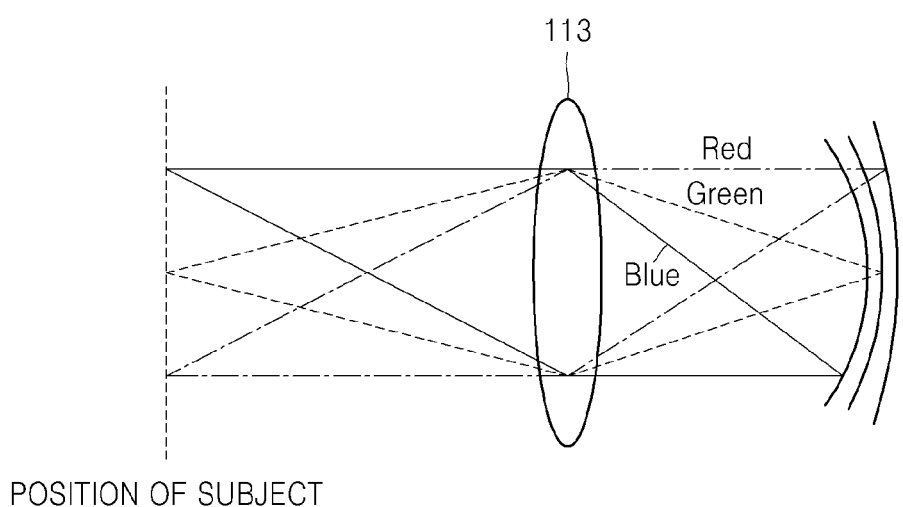

FIGS. 2A and 2B illustrate the principle of generation of lens distortion (LD). The LD is a phenomenon in which distortion is generated in a photographed image due to a lens as incident light passes through the lens forming a focus surface that is a curved surface as illustrated in FIG. 2A. A degree of bending of an image due to the LD increases from the center of the photographed image toward the edge thereof, where the LD becomes serious. Also, the LD appears more severe in a wide-angle lens or a tele-zoom lens than in a general lens.

Since the focus surface appears to be curved as illustrated in FIG. 2A, the curved focus surface is referred to as a petzval field surface. However, since the image pick-up device 118 that receives an optical signal is a flat surface, a curvature phenomenon occurs in an image generated by the image pick-up device 118 so that the LD may be generated.

Also, as illustrated in FIG. 2B, the focus surface is formed differently accordingly the wavelength. As the wavelength decreases, a refractive index to the lens 113 increases. Accordingly, the distance between the focus surface and the lens 113 decreases, and curvature of the focus surface may increase. Thus, as illustrated in FIG. 2B, blue-based light whose wavelength is short has a short distance between the focus surface and the lens 113 compared to red-based light whose wavelength is long.

Figure 3:
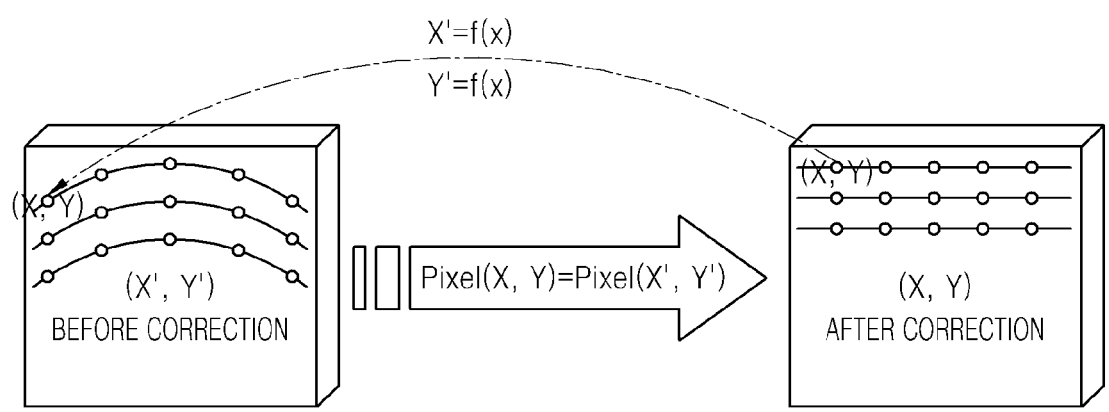
FIG. 3 illustrates the principle of the lens distortion correction.

FIG. 3 illustrates the principle of the LD correction. The LD correction (LDC) flattens an image bent due to the LD. As illustrated in FIG. 3, the LD may be corrected by applying affine transformation to the image bent due to the LD before correction to move each pixel. Assuming that a pixel (X,Y) is moved to a pixel (X',Y') due to the LD, the relationship between the pixels corresponding to each other in the images before and after the LDC may be expressed as in Relation 1.

$$X' = f(X)$$

$$Y' = f(Y)$$

$$\text{Pixel}(X,Y) = \text{Pixel}(X',Y') \qquad \text{[Relation 1]}$$

To correct the LD, the coordinate value (X,Y) indicating to which pixel of the image after correction each pixel (X',Y') of the image before correction corresponds may be obtained by using an inverse of the function f. To this end, a parameter value of the affine transformation is obtained and the affine transformation is applied to the pixel coordinates (X',Y') before correction, thereby obtaining the image after correction.

Figure 4A:
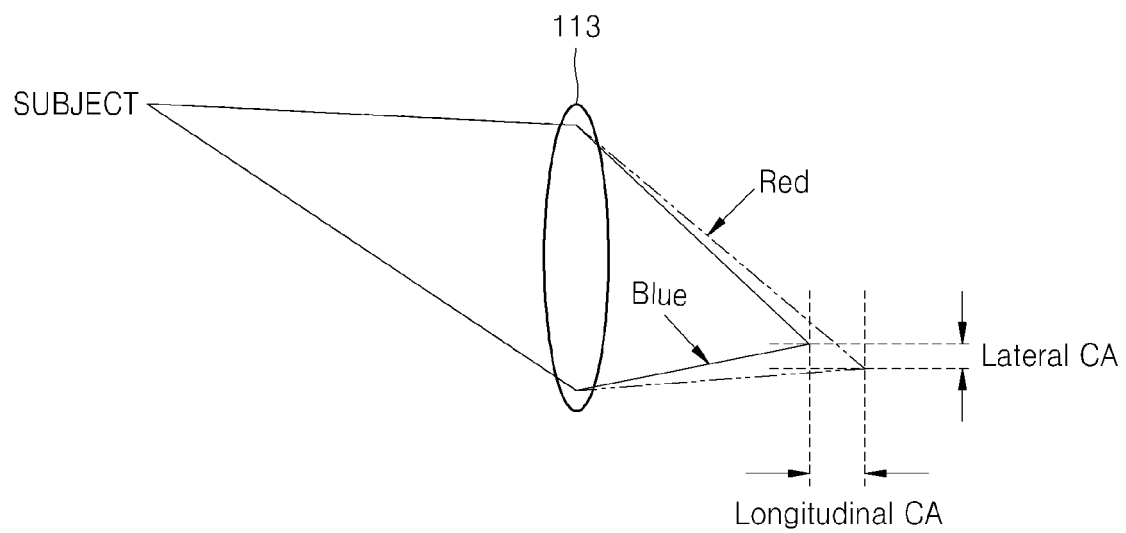
FIG. 4A illustrates the principle of generation of the chromatic aberration.

FIG. 4A illustrates the principle of generation of chromatic aberration (CA). The CA is generated due to a difference in the refractive index. As illustrated in FIG. 4A, as a wavelength of light increases, the refractive index decreases when the light passes through the lens 113 and thus a focal length increases. As a wavelength of the light decreases, the refractive index increases when the light passes through the lens 113 and thus a focal length decreases. The difference in the focal length causes the CA. In general, the CA becomes serious as the contrast between two areas having different colors increases. When the CA is generated, a phenomenon in which a violet color appears to be blurred frequently occurs. The CA includes a longitudinal CA generated due to the different focal lengths according to the wavelength and a lateral CA due to the different size of an image formed on the image pick-up device 118 according to the wavelength.

Figure 4B:
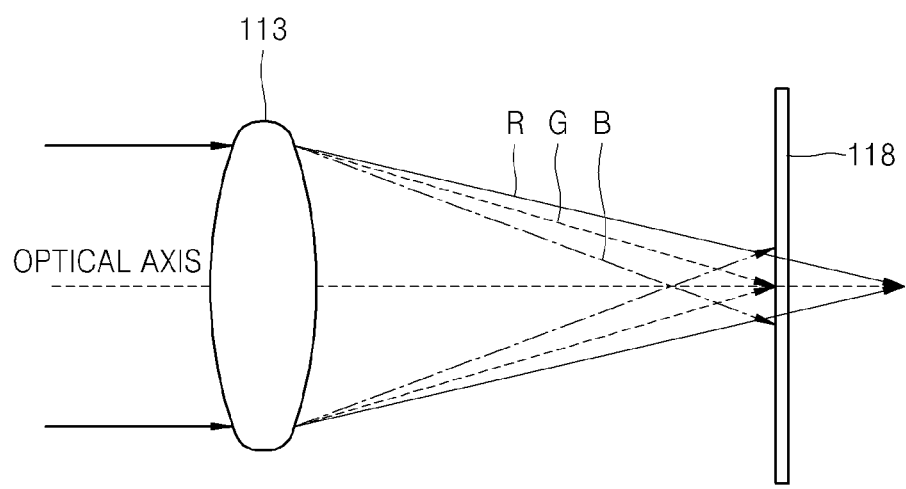
FIG. 4B illustrates the axial chromatic aberration.
Figure 4C:
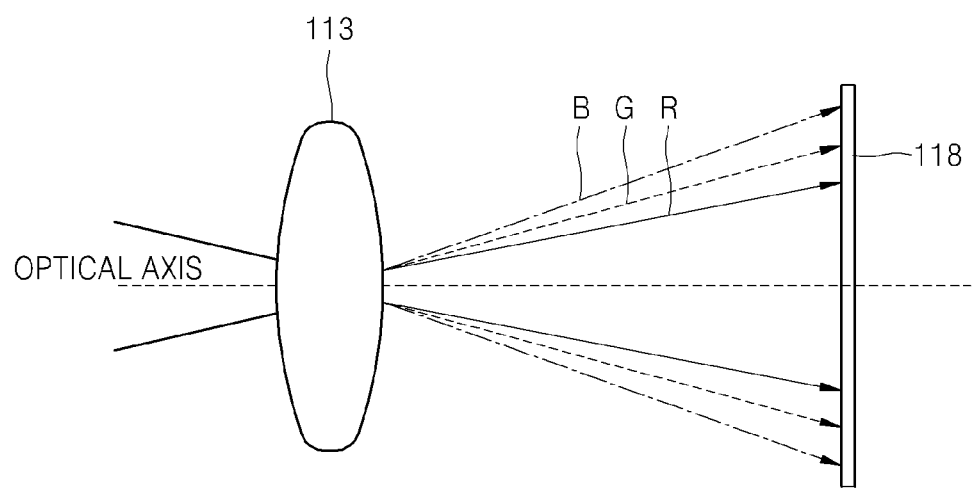
FIG. 4C illustrates the lateral chromatic aberration.

FIG. 4B illustrates the axial CA. FIG. 4C illustrates the lateral CA.

The longitudinal CA is generated because the focal length varies due to the difference in the refractive index according to the wavelength. The refractive index decreases as the wavelength increases. Thus, red-based light having a relatively long wavelength is focused far from the lens 113 compared to green-based light. Blue-based light having a relatively short wavelength is focused near to the lens 113 compared to the green-based light. As illustrated in FIG. 4B, when the position of image pick-up device 118 is determined based on the focal length of the green-based light, the blue-based light is focused in front of the image pick-up device 118 so that an inverse image may be generated in the image pick-up device 118 or color may appear to be blurred in the photographed image. Also, the red-based light is focused at the rear of the image pick-up device 118 so that color may appear to be blurred in the photographing image.

The lateral CA is generated because the size of an image formed on the image pick-up device 118 varies due to the different refractive index according to the wavelength. As illustrated in FIG. 4C, as the refractive index varies according to the wavelength, light of each wavelength passing through the lens 113 has a different path. When the light arrives at the image pick-up device 118, a subject in the photographed image appears to be blurred because the magnification ratios of the formed images of the subject are different from each other.

The LD and the CA may be corrected by using an additional correction lens. However, when the additional correction lens is used, costs increase and the thickness of the lens 113 increases so that the volume of the digital photographing apparatus may be increased.

Figure 5:
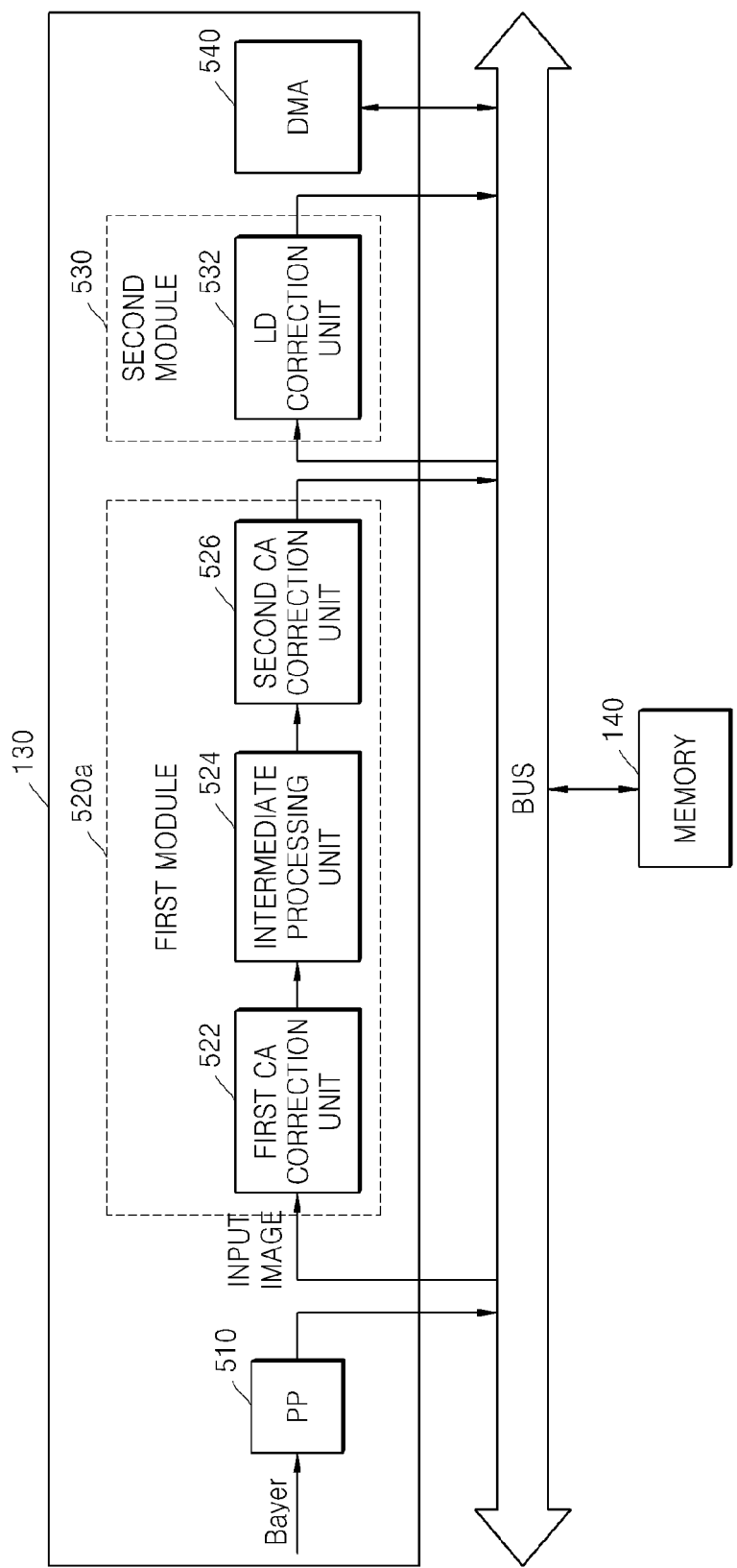
FIG. 5 is a block diagram of the digital signal processing unit and the memory, according to an embodiment.

FIG. 5 is a block diagram of the digital signal processing unit 130 and the memory 140, according to an embodiment. Referring to FIG. 5, the digital signal processing unit 130 according to the present embodiment includes a PP module 510, a first module 520a, a second module 530, and a direct memory access (DMA) 540. According to the present embodiment, these four constituent elements 510, 520a, 530, and 540 are independently configured in terms of hardware. Thus, it is assumed that no hardware conflict is generated between the four constituent elements 510, 520a, 530, and 540. In particular, according to the present embodiment, since the first module 520a and the second module 530 are independently configured in terms of hardware, no hardware conflict is generated between the first module 520a and the second module 530. If the first module 520a and the second module 530 share resources and there may be a resource conflict between the first module 520a and the second module 530, since the second module 530 may not process data while the first module 520a processes data, the second module 530 may wait until the data process in the first module 520a is completed, which generates delay.

The data processed by the PP module 510, the first module 520a, and the second module 530 is processed in units of blocks of an input image. The block may have a size of, for example, 8×8 or 16×16 pixels. The blocks are processed by each of the modules 510, 520a, and 530 for one cycle. Even when the overall input image is not processed by other modules having read and write (RAW) data dependency, each of the modules 510, 520a, and 530 may perform a corresponding process when the other module having the data dependency outputs a block of data. This is because each of the modules 510, 520a, and 530 is independently configured in terms of hardware. For example, when the second module 530 is assumed to process the data that has been processed by the first module 520a, that is, the second module 530 has the RAW data dependency on the first module 520a, and when a first block of data is output from the first module 520a to the memory 140, the second module 530 processes the first block of data output from the first module 520a at the next cycle to a cycle when the first block is processed by the first module 520a.

The first module 520a includes a plurality of CA correction units, that is, in the present embodiment, a first CA correction unit 522, an intermediate processing unit 524, and a second CA correction unit 526. The second module includes an LD correction unit 532. The data processed in the first module 520a is transferred in an on-the-fly method. That is, the first CA correction unit 522 transfers the processed data to the intermediate processing unit 524 in the on-the-fly method, and the intermediate processing unit 524 transfers the processed data to the second CA correction unit 526 in the on-the-fly method. Although, in the first module 520a according to the present embodiment, the intermediate processing unit 524 is provided between the first and second CA correction units 522 and 526, the first module 520a is not limited thereto, and the first module 520a may include a plurality of CA correction units.

The on-the-fly method denotes that data is transferred directly to the subsequent constituent element without passing through the memory 140. When the data is transferred to the subsequent constituent element via the memory 140, at least one cycle of delay is generated in latency due to the memory connection operation. In contrast, according to the on-the-fly method, since the process of the subsequent constituent element is performed without the memory connection operation, the process of the subsequent constituent element may be performed without a delay cycle.

FIG. 6A illustrates the structure of a pipeline of an image processing apparatus, according to an embodiment. FIG. 6B illustrates the structure of a pipeline of an image processing apparatus, according to a comparative example to the embodiment. An improved pipeline structure of the image processing apparatus according to the present embodiment is described below with reference to FIGS. 6A and 6B. In FIGS. 6A and 6B, "PP" denotes the processing of the PP module 510, "CAC1" denotes the processing of the first CA correction unit 522, "CAC2" denotes the processing of the second CA correction unit 526, and "LDC" denotes the processing of the LD correction unit 532. It is assumed that the processing of an input image is performed in order of PP, CAC1, CAC2, and LDC, and that data of one block is processed in each of a plurality of tiles. It is assumed that an input image is processed in each of the modules 510, 520a, and 530 through eight tiles. In the image processing apparatus according to the above comparative example, the first CA correction unit 522 and the LD correction unit 532 share hardware resources so that hardware conflict may be generated. Also, according to the comparative example, the first and second CA correction units 522 and 526 are configured by separated modules. The data is transferred between the first and second CA correction units 522 and 526 via a bus BUS and the memory 140.

The first block is processed in the PP module 510 during Tile 1 and then stored in the memory 140. The data of the first block that has been PP-processed is read out from the memory 140 and CAC1 is performed (Tile 1 of CAC1). According to the present embodiment, the data of the first block that has been CAC1-processed is transferred to the second CA correction unit 526 in the on-the-fly method so that no delay is generated between Tile 1 of the CAC1 and Tile 1 of the CAC2 (refer to FIG. 6A). In contrast, according to the comparative example, the data of the first block that has been CAC1-processed is transferred to the second CA correction unit 526 via the memory 140 so that a first delay Delay1 may be generated between Tile 1 of the CAC1 and Tile 1 of the CAC2 (refer to FIG. 6B).

According to the present embodiment, the data of the first block that has been CAC2-processed is transferred to the LD correction unit 532 of the second module 520 and undergoes LDC processing. Since the second module 530 is configured independently of the first module 520a in terms of hardware, even when the first module 520a is processing the data of the second block (Tile 2 of the CAC1 and CAC2 in FIG. 6A), the second module 530 may perform LDC-processing to the first block in parallel with the first module 520a. Thus, a delay of only one cycle due to the memory connection is generated between Tile 1 of the CAC2 and Tile 2 of the LDC (refer to FIG. 6A). However, in the above comparative example, since the first CA correction unit 522 and the LD correction unit 532 share resources, when the first CA correction unit 522 is in operation, the LD correction unit 532 cannot perform LDC processing. Thus, since the LD correction unit 532 needs to wait until the first CA correction unit 522 completes the processing of the input image, a second delay Delay2 of eight cycles is generated (refer to FIG. 6B).

According to the above-described embodiments, since the first and second delays Delay1 and Delay2 that may be generated in the comparative example are removed, the processing time to correct CA and LD of an input image may be remarkably reduced. Since the CA correction and LD correction are often continuously performed with respect to a live view image of a digital photographing apparatus, the technical effects of the above-described embodiments, improvement in a processing speed and the reduction of the bandwidth required by bus BUS, are very significant.

The operation of each of the constituent elements of the digital signal processing unit 130 will be described in detail. The memory 140 and each constituent element exchange data via the bus BUS of the image processing apparatus 100. Thus, each constituent element of the digital signal processing unit 130 connects to the memory 140 via the bus BUS.

The PP module 510 performs auto focusing or auto exposure on a Bayer pattern data of the input image and stores the processed data in the memory 140 via the bus BUS. The first CA correction unit 522 corrects CA of the input image by using a CA correction parameter that is determined according to the type and/or position of a lens used for photographing the input image.

Figure 7B:
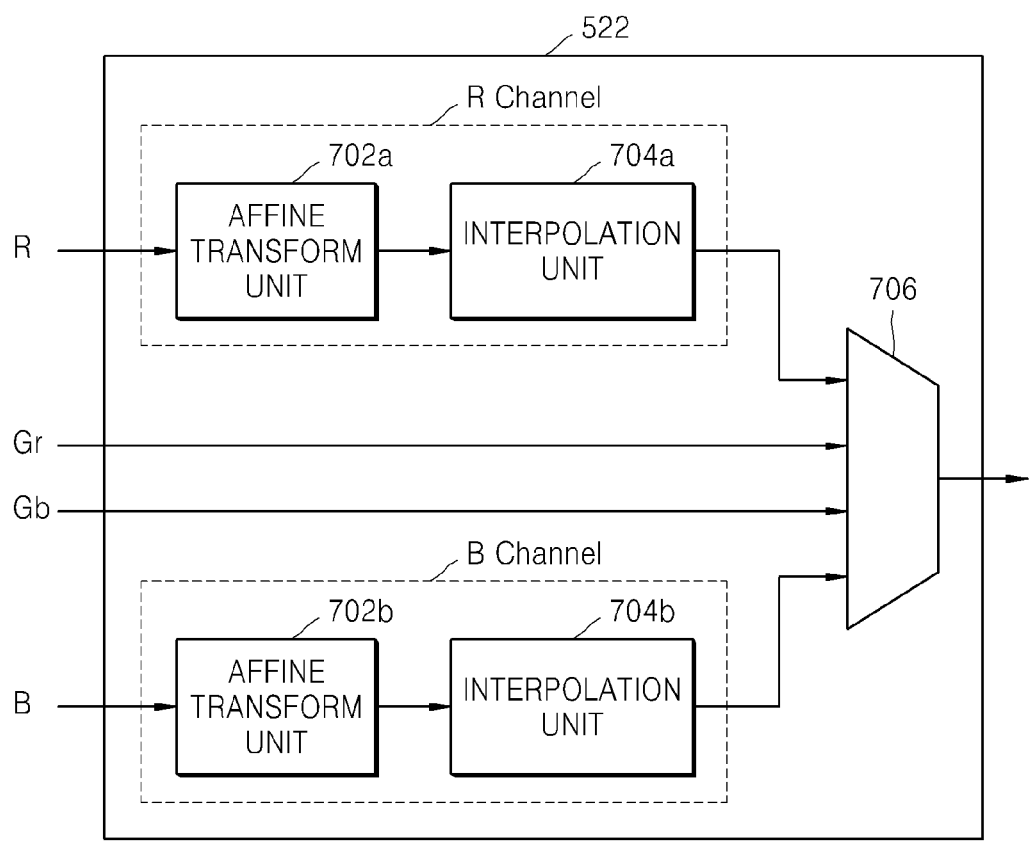
FIG. 7B is a block diagram illustrating the structure of the first chromatic aberration correction unit of FIG. 7A, according to an embodiment.

FIG. 7A is a conceptual diagram illustrating the operation of the first CA correction unit 522, according to an embodiment. FIG. 7B is a block diagram illustrating the structure of the first CA correction unit 522 of FIG. 7A, according to an embodiment.

The first CA correction unit 522, as illustrated in FIG. 7A, may receive an input image in an RGB data format, perform affine transformation and interpolation on each of RGB data, and output an image in the RGB data format. When the position of the image pick-up device 118 is determined according to the focal length of green-based light, G data may be bypassed without undergoing the affine transformation and the interpolation. The embodiment of bypassing the G data will be described below.

As illustrated in FIG. 7B, the first CA correction unit 522 performs CA correction to an R channel and a B channel independently of each other and bypasses G channels Gr and Gb without the CA correction process. The first CA correction unit 522 may include affine transform units 702a and 702b, interpolation units 704a and 704b, and a synthesis unit 706. The affine transform units 702a and 702b perform CA correction to correct CA of the input image by using a CA correction parameter that is determined according to the type and/or position of a lens.

FIG. 7C illustrates examples of the CA correction parameters, according to an embodiment. As illustrated in FIG. 7C, the CA correction parameters may be previously stored according to the type of a lens and the zooming step of a lens. Each of the CA correction parameters $N_1$, $N_2$, $N_3$, and $N_4$ may be parameters for the affine transformation in a matrix format.

Each of the interpolation units 704a and 704b performs an interpolation process to adjust pixel values of each pixel. The synthesis unit 706 synthesizes an image of the R, G, and B channels and generates and outputs a Bayer pattern image.

According to the present embodiment, the affine transform units 702a and 702b perform the affine transformation to the N-number of independent coordinates of an N-dimensional input image. When a 2-dimensional input image is to be processed, an existing affine transformation uses Relation 2.

$$X'=F(X)=\{S1\times(X-SCX)+S2\times(Y-SCY)+S3\}+SCX$$

$$Y'=F(Y)=\{S4\times(X-SCX)+S5\times(Y-SCY)+S6\}+SCY \quad \text{[Relation 2]}$$

In Relation 2, "S1", "S2", "S4", and "S5" are scaling CA correction parameters. "S3" and "S6" are shift CA correction parameters. "SCX" and "SCY" denote the centers of an optical axis. According to the present embodiment, assumptions are applied as shown in Relation 3.

1) If $\Delta X=0$, $\Delta Y \neq 0$, then $\Delta X'=0$.

2) If $\Delta X \neq 0$, $\Delta Y=0$, then $\Delta Y'=0$. [Relation 3]

According to the assumptions of Relation 3, in Relation 2, S2 and S4 become 0, and X and Y may be affine transformed independently of each other. Although the lateral CA actually becomes more serious at the peripheral side of a focal plane, since only scaling may appear, S2 and S4 may be considered to be 0. When S2 and S4 are processed to be 0, gate count is remarkably reduced, compared to a case of applying the CA correction parameter of S1-S6, so that the processing time may be reduced.

According to the present embodiment, since the affine transformation is performed to the X and Y independently of each other, even when the interpolation process after the affine transformation is taken into consideration, the first CA correction unit 522 may perform the CA correction process by using two line memories. A line memory denotes a storage space for storing a pixel corresponding to a row or column of the input image. For example, when the first CA correction unit 522 processes the input image in order of rows, the line memory is a storage space for storing a pixel corresponding to one row. The first CA correction unit 522 may include a storage space corresponding to two line memories.

Figure 8:
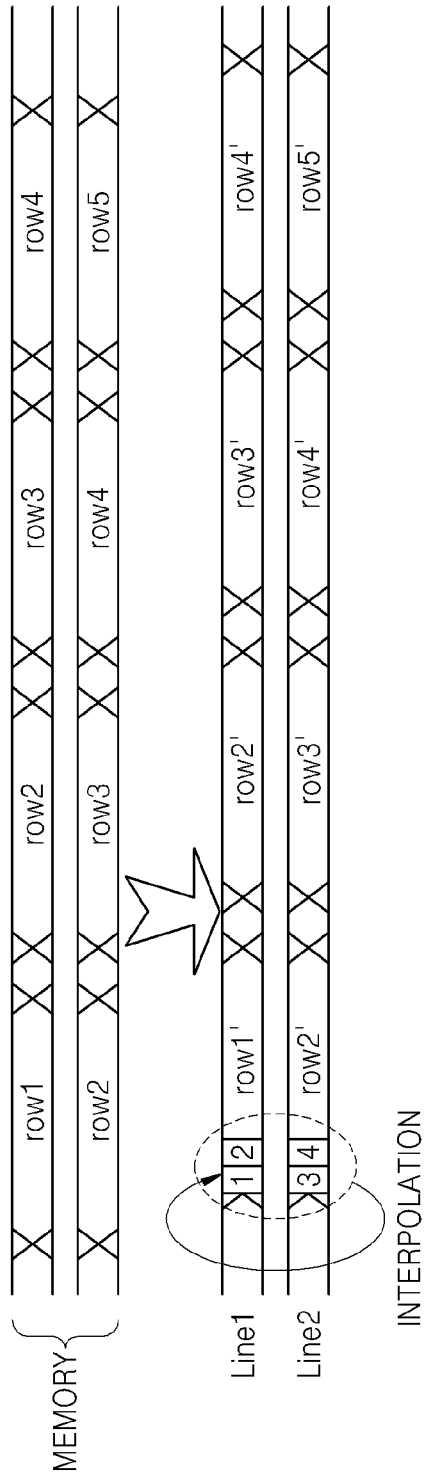
FIG. 8 is a data processing timing diagram of the first chromatic aberration correction unit of FIG. 7A, according to an embodiment.

FIG. 8 is a data processing timing diagram of the first CA correction unit 522 of FIG. 7A, according to an embodiment. The affine transformation is performed to each pixel to calculate a transformed coordinate of each pixel and the address of the line memory. The data of each pixel stored in the memory 140 is input to the first CA correction unit 522 via the DMA 540 and the bus BUS and stored in two line memories Line1 and Line2 of the first CA correction unit 522 according to the calculated address. Next, interpolation is performed by using the data 1, 2, 3, 4, stored in the two line memories Line1 and Line2. To perform interpolation on a pixel (x,y) stored in the line memory Line1, the data of the pixel (x,y) and a pixel (x,y+1) of the line memory Line1 and the data of a pixel (x+1,y) and a pixel (x+1,y+1) of the line memory Line2 are used. Thus, for performing the interpolation, the two line memories Line1 and Line2 are needed. The pixel (x,y) that is interpolated is stored again at an address corresponding to the pixel (x,y) of the line memory Line1.

The intermediate processing unit 524 may perform gamma correction, noise reduction, white balance correction, color calibration, or detail enhancement, on the data processed by the first CA correction unit 522.

The second CA correction unit 526 corrects CA based on the contrast of an input image. While the first CA correction unit 522 uses a CA correction parameter determined according to the type and/or position of a lens, the second CA correction unit 526 corrects the CA with only the input image without considering the information about the lens.

Figure 9:
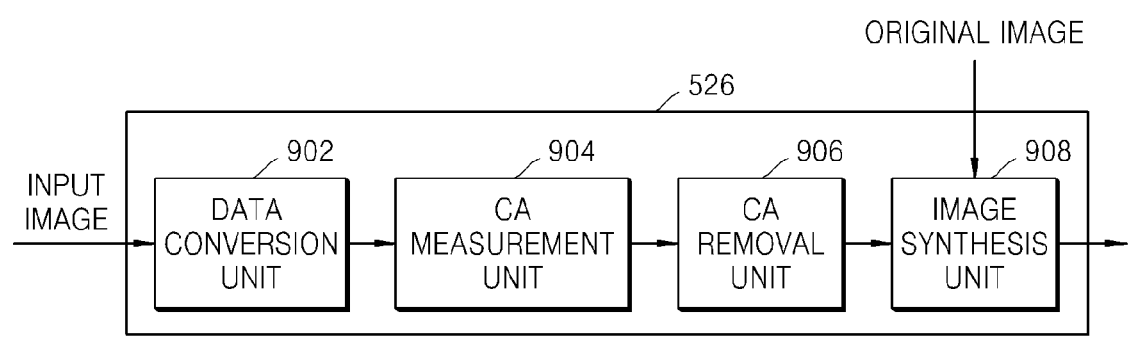
FIG. 9 is a block diagram illustrating the structure of the second chromatic correction unit, according to an embodiment.

FIG. 9 is a block diagram illustrating the structure of the second CA unit 526, according to an embodiment. Referring to FIG. 9, the second CA unit 526 includes a data conversion unit 902, a CA measurement unit 904, a CA removal unit 906, and an image synthesis unit 908.

The data conversion unit 902 converts the data format of an input image to a YCbCr format. The CA measurement unit 904 measures a degree of generation of CA from the input image. The degree of generation of CA may be measured based on the contrast of the input image. For example, when a contrast to neighboring pixels is high and a violet color occurs in a portion where the contrast is high, the CA measurement unit 904 may determine that CA is generated. The CA removal unit 906 removes the CA from the input image based on the degree of generation of the CA. For example, the CA removal unit 906 removes the violet color occurring in the portion where the contrast is high, from an area where CA is determined to be generated. The image synthesis unit 908 linearly synthesizes a corrected image where the CA is removed and an original image of the input image. For example, an average image between the corrected image and the original image may be obtained. The original image that is data of the input image input to the second CA correction unit 526 may be data of the input image processed by the first CA correction unit 522 and the intermediate processing unit 524.

The data processed by the first module 520a is output in units of blocks and stored in the memory 140 via the bus BUS. The second module 530 includes the LD correction unit 532. The second module 530 reads out and processes the data of the input image processed by the first module 520a and stored in the memory 140. The LD correction unit 532 corrects LD from the data of the input image. The LD, for example, may be corrected as described with reference to FIG. 3. The LD correction unit 532 is configured independently of the first module 520a in terms of hardware. Accordingly, when the first module 520a outputs input image data of the first block, the LD correction unit 532 may process the input image data of the first block at the next cycle (Tile 1 of LDC in FIG. 6A) to the cycle (Tile 1 of CAC1 and CAC2 in FIG. 6A) at which the input image data of the first block is processed. The DMA 540 converts the format of data to a data format required by each constituent element.

Figure 10:
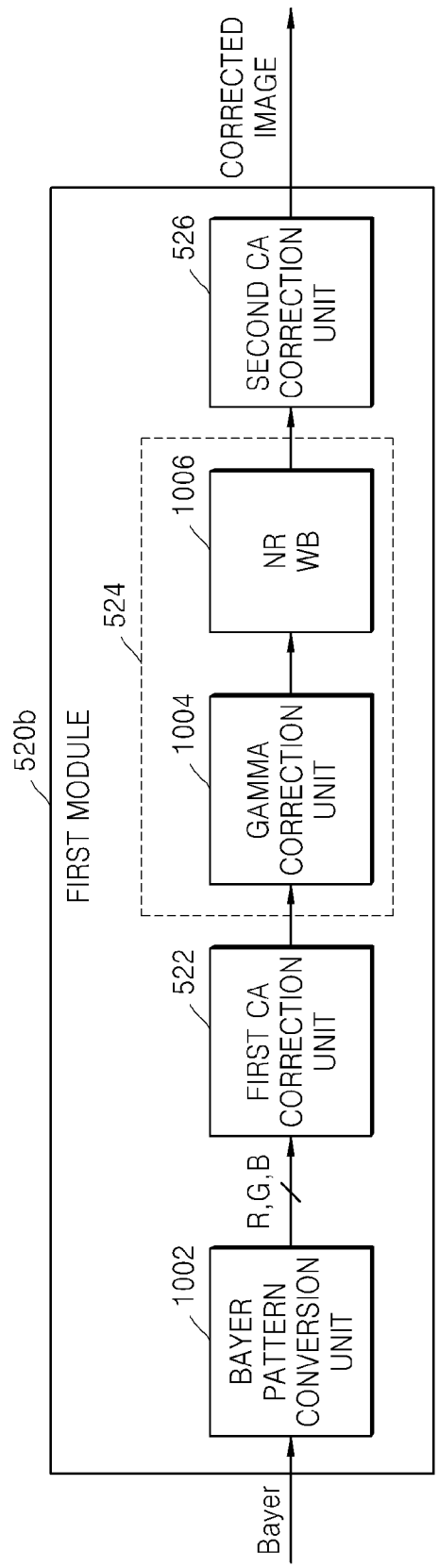
FIG. 10 is a block diagram illustrating the structure of the first module, according to another embodiment.

FIG. 10 is a block diagram illustrating the structure of a first module 520b, according to another embodiment. Referring to FIG. 10, the first module 520b according to the present embodiment includes a Bayer pattern conversion unit 1002, the first CA correction unit 522, a gamma correction unit 1004, a noise reduction (NR) and white balancing (WB) unit 1006, and the second CA correction unit 526.

The Bayer pattern conversion unit 1002 converts the data format of an input image input in a Bayer pattern to an RGB data format, and outputs the converted data format to the first CA correction unit 522. The gamma correction unit 1004 performs gamma correction on the data of the input image processed by the first CA correction unit 522. The noise reduction and white balancing unit 1006 performs a noise reduction process and a white balancing correction process on the data of the gamma corrected input image. The second CA correction unit 526 performs second CA correction on the data processed by the gamma correction unit 1004 and the noise reduction and white balancing unit 1006. According to the present embodiment, since the second CA correction is performed after the gamma correction and the white balancing process are completed, the regeneration of CA because the CA is re-amplified due to the gamma correction and the white balancing process may be prevented.

Figure 11:
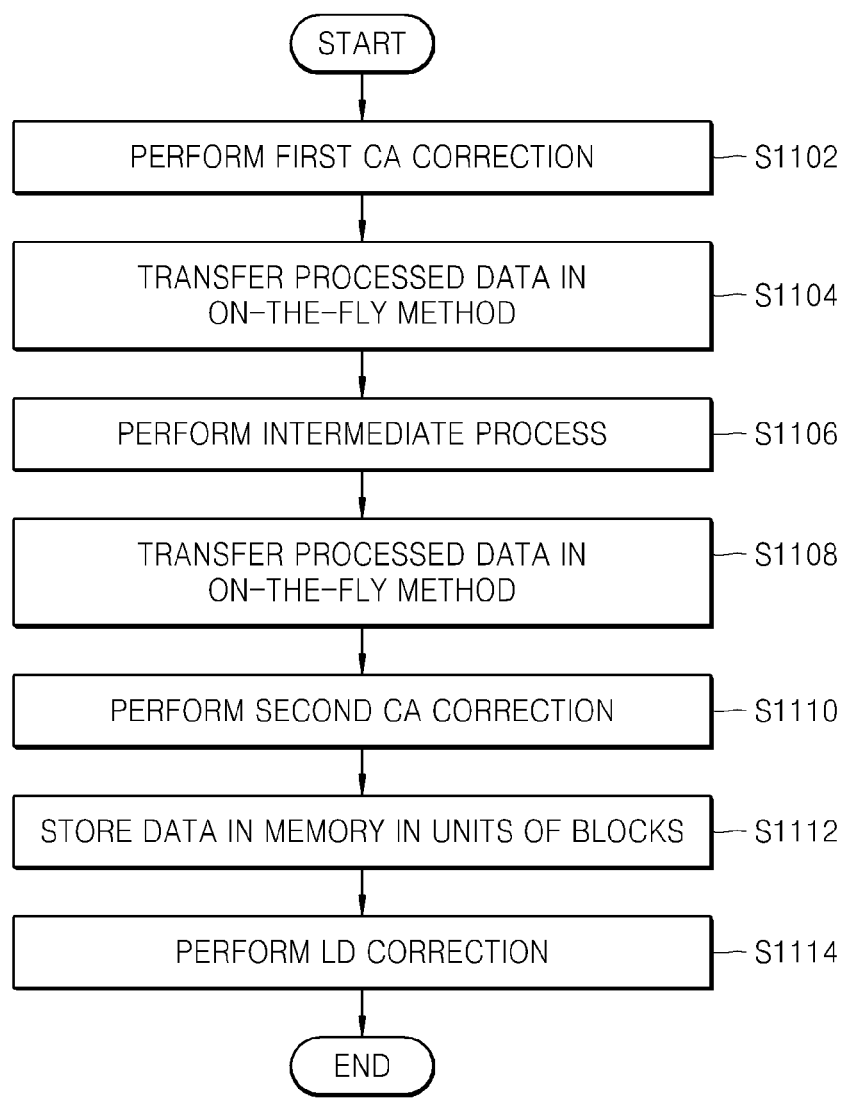
FIG. 11 is a flowchart for explaining an image processing method, according to another embodiment.

FIG. 11 is a flowchart for explaining an image processing method, according to another embodiment. Referring to FIG. 11, in the image processing method according to the present embodiment, in performing a plurality of CA correction processes, since the data of an input image is transferred in the on-the-fly method, a delay generated due to the connection to the memory 140 is removed. Also, since the CA correction process and the LD correction process are performed by using modules that are configured independently in terms of hardware, a hardware conflict is not generated.

Figure 12:
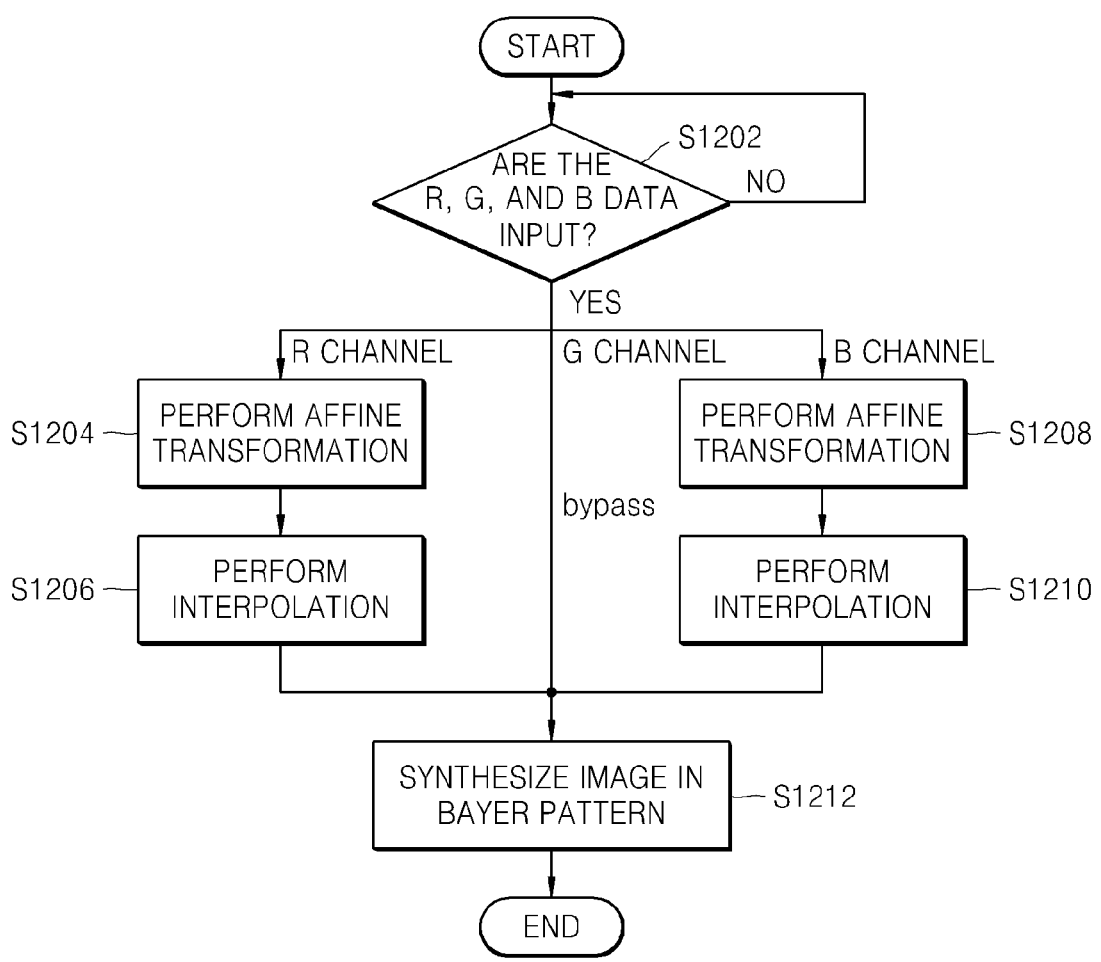
FIG. 12 is a flowchart for explaining a first chromatic aberration correction, according to an embodiment.

First, the first CA correction is performed on the input image by using a CA correction parameter that is determined according to the type and/or position of a lens (S1102). FIG. 12 is a flowchart for explaining the first CA correction, according to an embodiment. When RGB data is input (S1202), CA correction is independently performed on each of the RGB data. Affine transformation is performed on the R data (S1204). An interpolation process is performed on the affine transformed R data (S1206). Also, affine transformation is performed on the B data (S1208). An interpolation process is performed on the affine transformed B data (S1210). When the position of the image pick-up device 118 of a digital photographing apparatus photographing the input image is determined according to the focal length of the green-based light, the G data is bypassed without having the CA correction. The affine transformation processes according to the present embodiment (S1204 and S1208), for example, may be performed by using a predetermined CA correction parameter as illustrated in FIG. 7C. Also, according to the present embodiment, in the affine transformation processes S1204 and S1208, the affine transformation is performed independently of each other on N-number of independent coordinates of the N-dimensional input image. Thus, the assumption as in Relation 3 may be applied, and as illustrated in FIG. 8, the affine transformation may be performed by using only two line memories.

When the affine transformation processes S1204 and S1208 and the interpolation processes S1206 and S1210 with respect to the R data and the B data are completed, an image is formed in a Bayer pattern by synthesizing the R data, the G data, and the B data (S1212).

Next, the data that has completed the first CA correction is transferred in the on-the-fly method to a constituent element for intermediate process (S1104). The intermediate process such as gamma correction, noise reduction, white balance correction, color calibration, or detail enhancement is performed on the data having completed the first CA correction (S1106). When the intermediate process is completed, the data of an input image is transferred in the on-the-fly method to the constituent element for the second CA correction (S1108).

The second CA correction is performed on the intermediate processed data, based on the contrast of the input image (S1110). While the CA correction parameter that is determined according to the type and/or position of a lens is used for the first CA correction, in the second CA correction, the CA is corrected with only the input image itself without considering the information about the lens.

Figure 13:
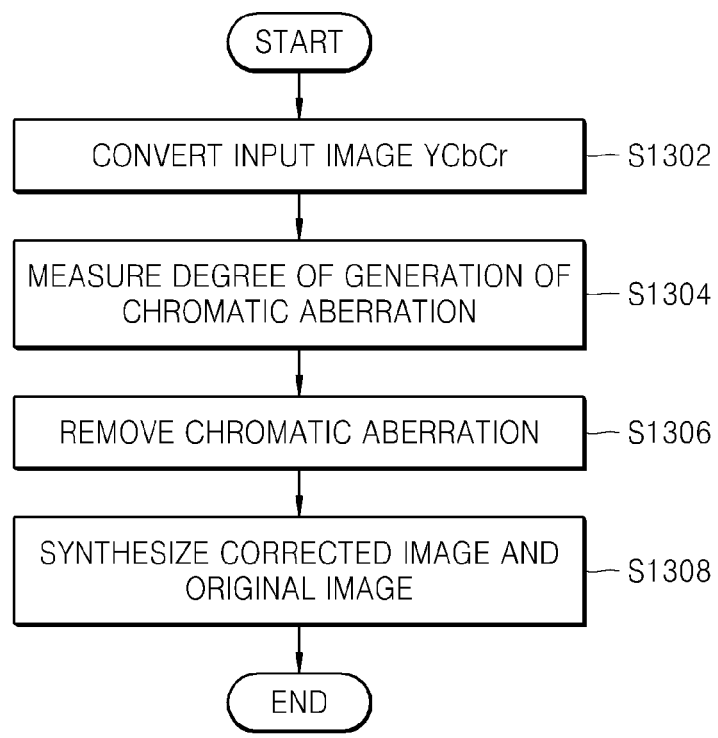
FIG. 13 is a flowchart for explaining a second chromatic aberration correction, according to an embodiment.

FIG. 13 is a flowchart for explaining a second chromatic aberration correction, according to an embodiment. Referring to FIG. 13, the format of the data of the input image is converted to a YCbCr format (S1302). When the data in a YCbCr format is generated, a degree of generation of CA is measured from an input image (S1304). The degree of generation of CA may be measured based on the contrast of the input image. Next, the CA is removed based on the degree of generation of CA of the input image (S1306). Finally, a corrected image in which the CA is removed and the original image of the input image are linearly synthesized (S1308). For example, an average image between the corrected image and the original image may be obtained.

When the second CA correction is completed (S1110), the data of the CA corrected image is stored in the memory 140 in units of blocks (S1112). Next, the data of the CA corrected image stored in the memory 140 is read out in units of blocks to correct LD of the CA corrected image (S1114). The LD may be corrected as described with reference to FIG. 3, for example.

As described above, according to the above-described embodiments, during a plurality of chromatic aberration correction processes, data is transferred in an on-the-fly method so that the memory write-read operations may be reduced during the chromatic aberration correction processes, the image processing time may be reduced, unnecessary memory use may be reduced, and a bus bandwidth occupied during the chromatic aberration correction processes may be reduced.

Also, according to the above-described embodiments, since the module including a chromatic aberration correction process and the module including a lens distortion correction process are configured independently in terms of hardware, a hardware conflict between the chromatic correction process and the lens distortion correction process is removed so that the image processing time may be reduced.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. For example, the computer readable code may be configured to perform operations to embody the image processing method according to the invention when the computer readable code is read and executed by the digital signal processing unit 130 from the computer-readable media. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. An image processing apparatus for processing an input image generated by an image pick-up device from an optical signal passing through a lens, the image processing apparatus comprising:
    a first module comprising a plurality of chromatic aberration correction units that correct chromatic aberration in the input image;
    a second module, configured independently of the first module in terms of hardware, comprising a lens distortion correction unit that corrects lens distortion in the input image;
    a memory that stores data; and
    a bus connected to the first module, the second module, and the memory, and that transfers data between the first module, the second module, and the memory,
    wherein the data is transferred in an on-the-fly method between the plurality of chromatic aberration correction units of the first module, the first module outputs data processed in units of blocks that are units for processing the data of the input image in the first module, and the second module performs lens distortion correction when the data of the input image of a block is output from the first module,
    wherein the plurality of chromatic aberration correction units comprise:
        a first chromatic aberration correction unit that corrects chromatic aberration in the input image by using a chromatic aberration correction parameter that is determined according to at least one of a type and position of a lens; and
        a second chromatic aberration correction unit that corrects chromatic aberration on the data of the input image that is processed by the first chromatic aberration correction unit, based on contrast of the data of the input image that is processed by the first chromatic aberration correction unit,
    wherein the lens distortion correction unit corrects lens distortion in the input image that is processed by the first module.

2. The image processing apparatus of claim 1, wherein the first chromatic aberration correction unit comprises:
    an affine transformation unit that performs affine transformation to correct chromatic aberration in the input image by using the chromatic aberration correction parameter; and
    an interpolation unit that performs an interpolation process on the data of the input image that is affine transformed.

3. The image processing apparatus of claim 2, wherein the input image is an N-dimensional image, where N is a natural number, and the affine transformation unit performs affine transformation on N-independent coordinates, independently of each other, with respect to the N-dimension.

4. The image processing apparatus of claim 3, wherein the first chromatic aberration correction unit uses two line memories, the line memory denotes a storage space that stores a pixel corresponding to a row or column of the input image, and the processed data of the input image is output in an on-the-fly method in units of a line memory.

5. The image processing apparatus of claim 1, wherein the input image input to the first chromatic aberration correction unit has an RGB data format, and the first chromatic aberration correction unit performs chromatic aberration correction on each of the R and B data independently of each other and bypasses G data without performing the chromatic aberration correction.

6. The image processing apparatus of claim 1, wherein the first module further comprises an intermediate processing unit that performs at least one of a white balance process and a noise reduction process on the data of the input image that is processed by the first chromatic aberration correction unit, and the second chromatic aberration correction unit performs chromatic aberration correction on the data of the input image that is processed by the intermediate processing unit.

7. The image processing apparatus of claim 1, wherein the second chromatic aberration correction unit comprises:
    a data conversion unit that converts the data of the input image to a YCbCr data format;
    a chromatic aberration measurement unit that measures a degree of generation of chromatic aberration, from the data of the input image, based on contrast information of the input image;
    a chromatic aberration removal unit that corrects chromatic aberration from the data of the input image according to the degree of generation of chromatic aberration; and
    an image synthesis unit that linearly synthesizes an image corrected by the chromatic aberration removal unit and an original image of the input image.

8. The image processing apparatus of claim 1, wherein the data transferred between the first and second modules is transferred via the bus and the memory.

9. An image processing method for processing an input image generated by an image pick-up device from an optical signal passing through a lens, the image processing method comprising:
    performing a plurality of chromatic aberration correction processes on the input image by transferring data in an on-the-fly method;
    storing the data processed by the plurality of chromatic aberration correction processes in a memory in units of blocks that are units for processing data of the input image in performing of the plurality of chromatic aberration correction processes; and correcting lens distortion in the input image stored in the memory, wherein the performing of the plurality of chromatic aberration correction processes and the correction of lens distortion are performed by using resources configured independently in terms of hardware, and when the chromatic aberration correction of the data of the input image of a block in the performing of the plurality of chromatic aberration correction processes is completed, in the correction of lens distortion, lens distortion correction is performed on the data of the input image of a block where the chromatic aberration is corrected, wherein the performing of the plurality of chromatic aberration correction processes comprises:

a first chromatic aberration correction operation that corrects chromatic aberration in the input image by using a chromatic aberration correction parameter that is determined according to at least one of a type and position of a lens; and a second chromatic aberration correction operation that corrects chromatic aberration on the data of the input image that is processed in the first chromatic aberration correction operation, based on contrast of the data of the input image that is processed in the first chromatic aberration correction operation.

10. The image processing method of claim 9, wherein the first chromatic aberration correction operation comprises:

an affine transformation operation that performs affine transformation to correct chromatic aberration in the input image by using the chromatic aberration correction parameter; and an interpolation operation that performs an interpolation process on the data of the input image that is affine transformed.

11. The image processing method of claim 10, wherein the input image is an N-dimensional image, where N is a natural number, and in the affine transformation operation, affine transformation is performed on N-independent coordinates, independently of each other, with respect to the N-dimension.

12. The image processing method of claim 11, wherein, in the first chromatic aberration correction operation, two line memories are used, the line memory denotes a storage space for storing a pixel corresponding to a row or column of the input image, and the processed data of the input image is output in an on-the-fly method in units of a line memory.

13. The image processing method of claim 9, wherein the input image processed in the first chromatic aberration correction operation has an RGB data format, and in the first chromatic aberration correction operation, chromatic aberration correction is performed on each of the R and B data independently of each other and G data is bypassed without application of the chromatic aberration correction.

14. The image processing method of claim 9, further comprising an intermediate processing operation, after the first chromatic aberration correction operation, in which at least one of a white balance process and a noise reduction process is performed on the data of the input image that is processed in the first chromatic aberration correction operation, wherein in the second chromatic aberration correction operation, chromatic aberration correction is performed on the data of the input image that is processed in the intermediate processing operation.

15. The image processing method of claim 9, wherein the second chromatic aberration correction operation comprises:

a data conversion operation that converts the data of the input image to a YCbCr data format;

a chromatic aberration measurement operation that measures a degree of generation of chromatic aberration, from the data of the input image, based on contrast information of the input image;

a chromatic aberration removal operation that corrects chromatic aberration from the data of the input image according to the degree of generation of chromatic aberration; and an image synthesis operation that linearly synthesizes an image corrected in the chromatic aberration removal operation and an original image of the input image.

16. A non-transitory computer readable storage medium having computer program instructions stored thereon that, when executed by a processor, cause the processor to perform an image processing method of processing an input image generated by an image pick-up device from an optical signal passing through a lens, the image processing method comprising:

performing a plurality of chromatic aberration correction processes on the input image, by using an on-the-fly method;

storing the data processed by the plurality of chromatic aberration correction processes in a memory unit in units of blocks that are units for processing data of the input image in performing of the plurality of chromatic aberration correction processes; and correcting lens distortion in the input image stored in the memory, wherein the performing of the plurality of chromatic aberration correction processes and the correction of lens distortion are performed by using resources configured independently in terms of hardware, and when the chromatic aberration correction of the data of the input image of a block in the performing of the plurality of chromatic aberration correction processes is completed, in the correction of lens distortion, lens distortion correction is performed on the data of the input image of a block where the chromatic aberration is corrected, wherein the performing of the plurality of chromatic aberration correction processes comprises:

a first chromatic aberration correction operation that corrects chromatic aberration in the input image by using a chromatic aberration correction parameter that is determined according to at least one of a type and position of a lens; and a second chromatic aberration correction operation that corrects chromatic aberration on the data of the input image that is processed in the first chromatic aberration correction operation, based on contrast of the data of the input image that is processed in the first chromatic aberration correction operation.

17. The non-transitory computer readable storage medium of claim 16, wherein the first chromatic aberration correction operation comprises:

an affine transformation operation that performs affine transformation to correct chromatic aberration in the input image by using the chromatic aberration correction parameter; and an interpolation operation that performs an interpolation process on the data of the input image that is affine transformed.

18. The non-transitory computer readable storage medium of claim 17, wherein the input image is an N-dimensional image, where N is a natural number, and in the affine transformation operation, affine transformation is performed on N-independent coordinates, independently of each other, with respect to the N-dimension.

19. The non-transitory computer readable storage medium of claim 18, wherein, in the first chromatic aberration correction operation, two line memories are used, the line memory denotes a storage space for storing a pixel corresponding to a row or column of the input image, and the processed data of the input image is output in an on-the-fly method in units of a line memory.

20. The non-transitory computer readable storage medium of claim 16, wherein the input image processed by the first chromatic aberration correction operation has an RGB data format, and in the first chromatic aberration correction operation, chromatic aberration correction is performed on each of the R and B data independently of each other and G data is bypassed without application of the chromatic aberration correction.

21. The non-transitory computer readable storage medium of claim 16, further comprising an intermediate processing operation, after the first chromatic aberration correction operation, in which at least one of a white balance process and a noise reduction process is performed on the data of the input image that is processed in the first chromatic aberration correction operation, wherein in the second chromatic aberration correction operation, chromatic aberration correction is performed on the data of the input image that is processed in the intermediate processing operation.

22. The non-transitory computer readable storage medium of claim 16, wherein the second chromatic aberration correction code portion comprises:
wherein the second chromatic aberration correction operation comprises:
a data conversion operation that converts the data of the input image to a YCbCr data format;
a chromatic aberration measurement operation that measures a degree of generation of chromatic aberration, from the data of the input image, based on contrast information of the input image;
a chromatic aberration removal operation that corrects chromatic aberration from the data of the input image according to the degree of generation of chromatic aberration; and an image synthesis operation that linearly synthesizes an image corrected in the chromatic aberration removal operation and an original image of the input image.

* * * * *